Sept. 20, 1960 R. A. ISOLA 2,953,308
DOMESTIC APPLIANCE
Filed Sept. 26, 1957 2 Sheets-Sheet 1

INVENTOR.
Richard A. Isola
BY Edwin L. Dybvig
HIS ATTORNEY

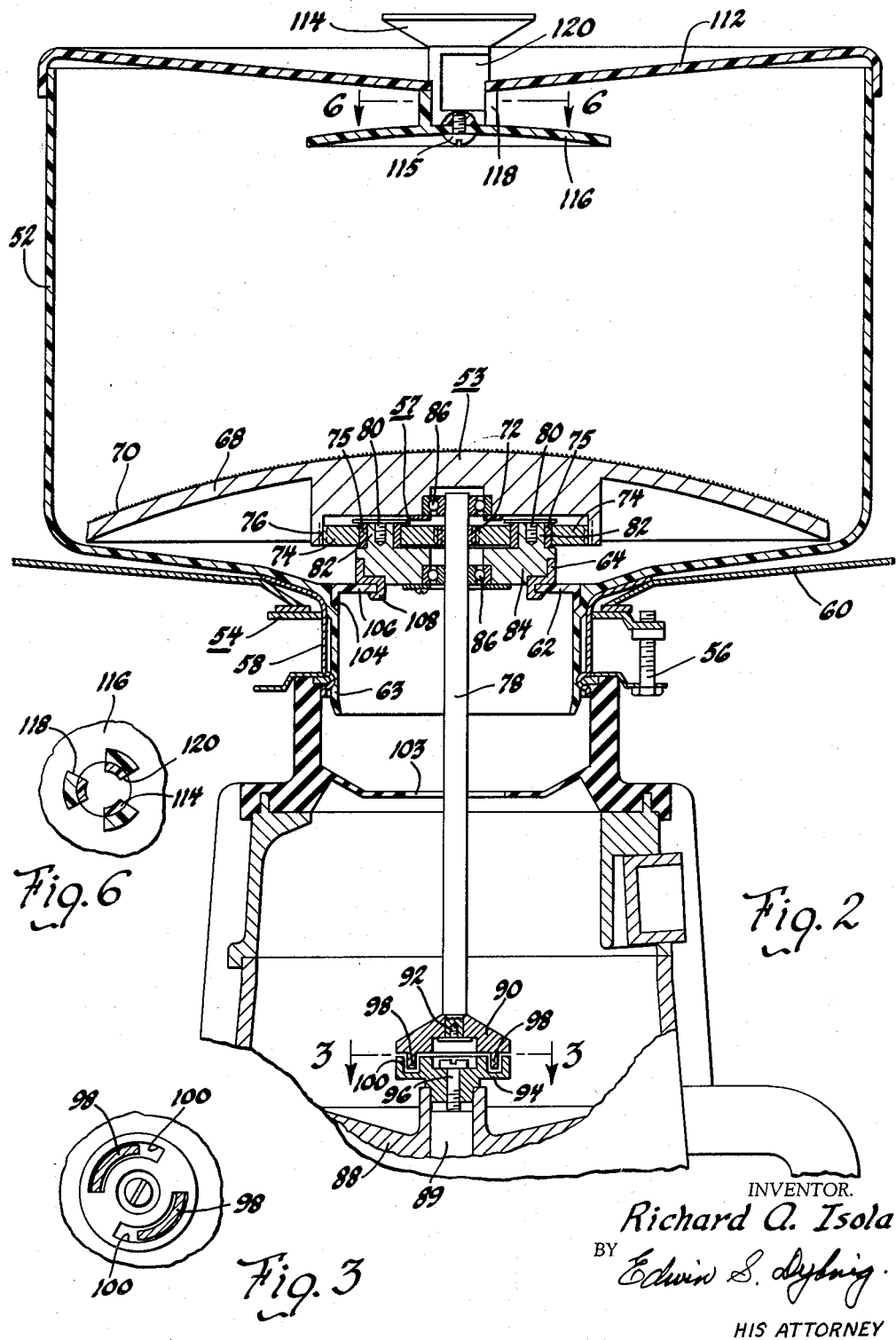

United States Patent Office 2,953,308
Patented Sept. 20, 1960

2,953,308
DOMESTIC APPLIANCE

Richard A. Isola, Oak Park, Mich., assignor to General Motors Corporation, Detroit, Mich., a corporation of Delaware Filed Sept. 26, 1957, Ser. No. 686,435

1 Claim. (Cl. 241—101)

This invention relates generally to a device for abrading or peeling the skins of vegetables and fruits.

The preparation of meals has always been accompanied by the relatively disagreeable tasks of peeling vegetables and fruit, removing the resulting waste and subsequently cleansing the area where this operation is performed.

Accordingly, it is an object of this invention to provide a depressed or auxiliary portion of a kitchen sink for the abrading of fruits and vegetables wherein the skins of such produce may be removed; to make such abrading mechanism removable from and operative by a conventional sink connected disposal unit and to supply for such co-operation a novel bayonet fitting to effect the removable connection of the abrader to the disposal unit; to eliminate the need for a vegetable or fruit receptacle integrally associated with the removable abrading mechanism; and to form the abrading receptacle or auxiliary sink portion of a sound-deadening material such as polyethylene.

Further objects and advantages of the present invention will be apparent from the following description, reference being had to the accompanying drawings, wherein a preferred form of the present invention is clearly shown.

In the drawings:

Figure 2 is a vertical section through the center of another embodiment of the invention showing the means for securing the abrading attachment to the disposal unit and to an integrally associated abrading receptacle;

Figure 3 is a fragmentary sectional view taken substantially along the line 3—3 of Figure 2, depicting the bayonet fitting for connecting the abrader shaft to the disposal unit adapter;

Figure 6 is a sectional view along the line 6—6 of Fig. 2 showing access openings for a flushing medium in the cover handle of one embodiment of my invention.

Figure 1:
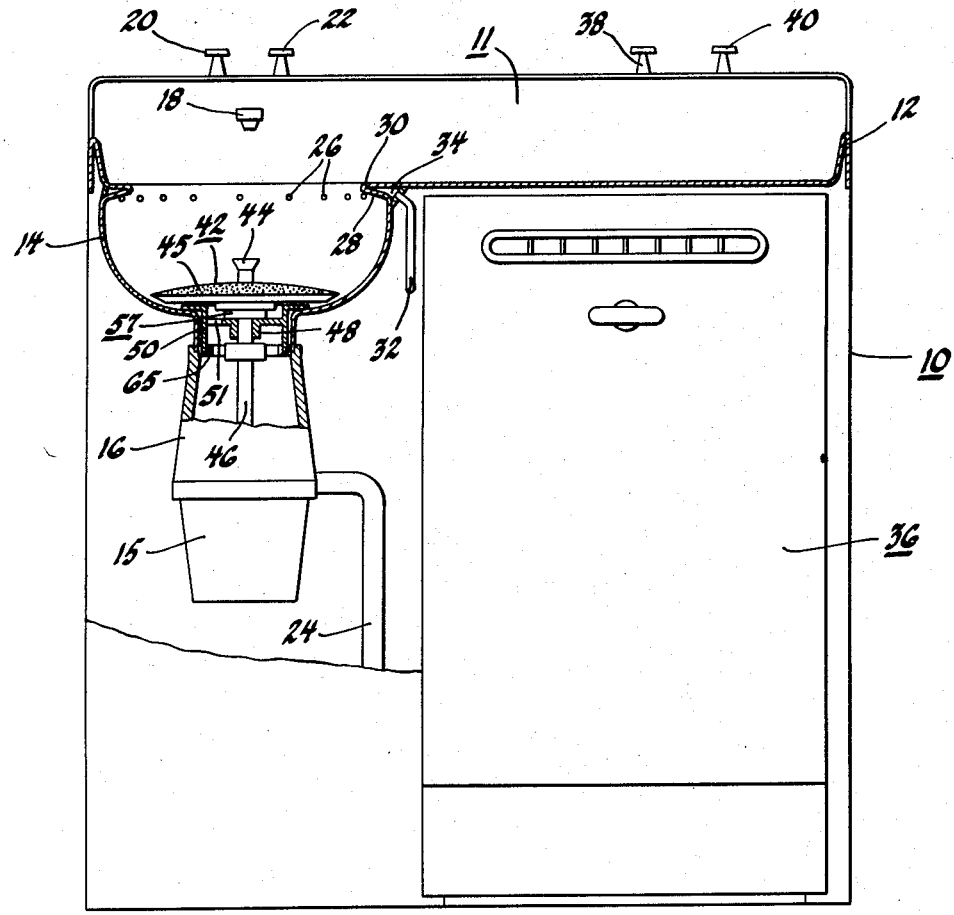
Figure 1 is a front elevational view, with parts broken away, of a combination sink, abrader and disposal unit.

As best seen in Fig. 1, the invention is embodied in a kitchen cabinet structure shown generally at 10 and having a sink 11 comprised of an upper, relatively shallow bowl or utility sink portion 12 and a lower bowl or depressed auxiliary sink portion 14 with a waste disposal unit 16 of conventional design attached therebelow. A water connection 18 having control member 20, 22 is attached to sink portion 12 for supplying water thereto. A drain connection 24 is adapted to remove such water and any collected waste from both the utility and auxiliary sink portions. Of special significance in the sink of this invention is the provision for equally spaced spray jets 26 peripherally arranged about the bottom 28 of lip 30 formed at the top of the depressed auxiliary sink portion 14. Water is supplied through conduit 32 to annular chamber 34 and thereby equally distributed to and through the spray jets 26. This arrangement greatly facilitates the flushing of waste material into the disposal unit and aids in providing a clean sink at all times. Suitable controls (not shown) may be provided whereby the supply of water through spray jets 26 is actuated whenever the disposal unit is in operation. The embodiment of this invention shown in Fig. 1 is shown provided with a front-opening dishwasher 36 having controls 38, 40 but conventional cabinets could be substituted as well for the dishwasher. The two-part sink formed to facilitate the application of an abrading device is illustrated as constructed of any suitable metal. Still, it is a particular objective of this invention to form either the entire sink 11 or the auxiliary portion 14 of any yieldable sound-deadening material such as polyethylene. With either of these constructions, the noise and vibration attendant either the abrader or disposal operation is substantially minimized. Where only the depressed auxiliary portion 14 is formed of the sound-deadening substance, any suitable compression fitting may be utilized to secure this portion to the utility sink portion 12.

The specially designed sink set forth above has been equipped with a rotatable abrading wheel assembly 42 powered by the motor 15 of a conventional disposal unit 16 and removable therefrom by handle 44. A more complete description of the mounting arrangement of this removable abrader will be set forth following in connection with the embodiment of Fig. 2. Suffice it to say for this purpose an abrader wheel 45 is secured to shaft 46 journalled in bearing sleeve 48 which is carried in a sink mounted cylinder 50.

A second embodiment is best seen in Fig. 2 wherein an abrading receptacle 52 is made a part of the abrader wheel assembly 53. This self contained abrading unit is thus adapted for removable installation in any disposal unit-equipped sink having a configuration other than that illustrated by the novel sink 11 of Fig. 1. It is with reference to the structure of Fig. 2 that the connecting arrangement between the abrader and the disposal unit found suitable for either embodiment will now be clearly described.

Any suitable compression fitting 54 made adjustable with set-screw 56 may be used to secure the disposal unit and the drain plate sleeve 58 forming the drain opening to sink 60. Receptacle 52 then frictionally engages the side walls of the sleeve 58 in obtaining an operative relationship with respect to the disposal unit. A disc 62 (Fig. 4) is secured to receptacle 52 or made integral therewith and forms the support member with which the abrader lock sleeve 64 (Fig. 5) cooperates for mounting the abrading wheel assembly depicted generally at 53. Since the speed of the garbage disposal unit is much greater than the desired speed of the abrading wheel, a speed reducing mechanism 57 is provided in each form of the invention between the main motor drive shaft and the abrading wheel. A platen 68 is surface-treated with a suitable abrading means 70 and is mounted on a planetary gear speed reducer comprised of a driving pinion 72 secured to shaft 78, intermediate gears 74 journalled on sleeve bearings 75 and a driven annular gear 76 integral with said platen 68. Bolts 80 retain sleeve bearings 75 and intermediate gears 74 on bosses 82 of the stationary intermediate gear base 84. With the platen 68 in place, shaft 78 is journalled in bearings 86 and depends from the abrading wheel assembly for each attachment to the impeller 88 of the cooperating disposal unit, as more fully described next following.

Exceptionally easy attachment of the abrading wheel assembly to any disposal unit is a feature of this invention. The means for drivingly connecting the abrading wheel assembly to the disposal drive shaft is the same in both forms shown. As indicated in Fig. 2, a bayonet portion 90 is secured to shaft 78 as with bolt 92, and an adapter portion 94 is secured as by bolt 96 to disposal impeller 88. Fig. 3 more clearly illustrates the connection between bayonet portion 90 and adapter 94, pointing out how bayonet feet 98 insert and rotatably lock within adapter arcuate sockets 100. This arrangement provides for easily inserting the shaft 78 of the abrader wheel assembly through the access opening 103 of the disposal unit into a secure rotatable connection with the impeller 88 of this disposer. The impeller 88 is carried directly by the upper end of the motor shaft 89.

Figure 4:
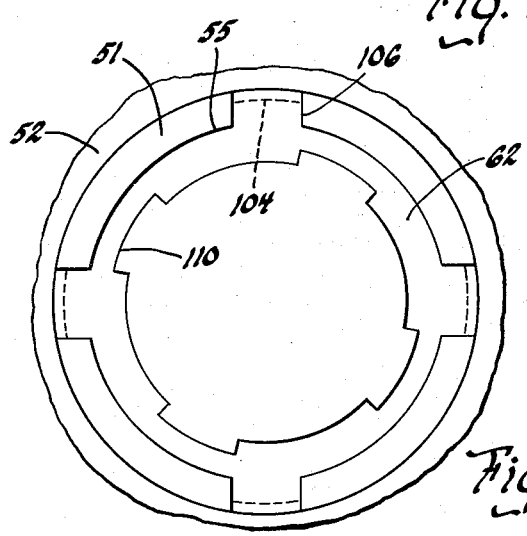
Figure 4 is a fragmentary top view of the sink or abrading receptacle mounted lock and support disc.
Figure 5:
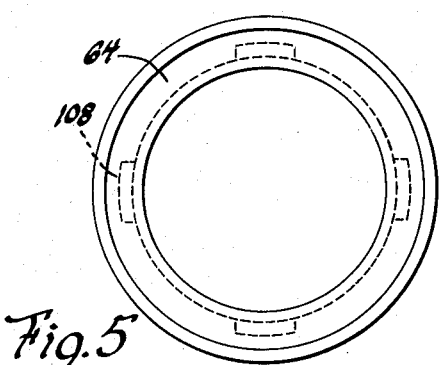
Figure 5 is a top view of the abrader mounting lock sleeve which cooperates with the lock and support disc of Figure 4.

With greater particularity, the arrangement whereby the abrading wheel assembly is lockingly supported on the integrally attached abrading receptacle 52 of Fig. 2 will now be described, reference being made to Figs. 2, 4 and 5. Feet 104 depending from radially extending tabs 106 on lock and support disc 62 rest on or are integral with neck portion 63 of receptacle 52 in Fig. 2. The apertures 51 formed by notches 55 in disc 62 allow for passage of waste to the disposal unit. This relationship retains the disc in position to receive the cooperating locking feet 108 of the lock sleeve 64. To lock the abrading assembly into secure relationship with the support disc, feet 108 of lock disc 64 are placed within notches 110 of support disc 62 and turned 45° relative thereto. Such locked condition is clearly shown in Fig. 2. This last-mentioned locking arrangement may be adapted to the embodiment of Fig. 1 but for the purposes of illustration the abrading assembly 42 (Fig. 1) is retained by means of frictional engagement with a resilient seal 65 mounted in the throat of the disposal unit 16.

A cover arrangement for the modification of Fig. 2 provides for flushing the interior of the abrading receptacle 52. A cover 112 is provided on its top side with a handle 114 secured as by bolt 115 to a spreader 116 on the opposite side of said cover. Cooperating flushing slots 118, 120 are formed in handle 114 and spreader 116, respectively, (Fig. 6) to provide access for a flushing medium supplied through these slots to the spreader on the inside of the abrader receptacle 52. Cover 112 may be depressed at its center and ported at this point to facilitate directing water placed or flowed onto said cover toward the slots in the handle and spreader. This arrangement, it has been found, provides for the same side wall flushing advantages achieved through the use of peripherally arranged spray jets 26 in the depressed portion sink of Fig. 1.

With reference to Fig. 1, operation of this peeling combination is effected by placing the shaft of the abrader assembly within the adapter fitting installed permanently on the impeller of the disposal unit. Vegetables or fruits are placed within auxiliary receptacle 14 and are jostled about due to the rotation of the abrading disc 42. As the skins or peels are removed, water issuing from spray jets 26 flushes the side walls of the auxiliary sink and washes the debris beneath the abrading disc through the apertures 51 and into the disposal unit for removal to the sewer by way of drain 24.

While I have shown speed reducing gears between the main drive shaft and the platen 68, the platen could be driven at the same speed as the main shaft of the disposer.

While the embodiment of the invention as herein disclosed constitutes a preferred form, it is to be understood that other forms might be adopted, as may come within the scope of the claim which follows.

What is claimed is as follows:

In combination, a waste disposal unit having a grinding chamber, an impeller in said grinding chamber for the comminution of waste material, a circular adapter member affixed to the top of said impeller and having a pair of arcuate sockets, means for rotating said impeller, a produce peeler including yieldable sound deadening wall means forming an abrading chamber above said grinding chamber, said abrading chamber having an integral neck portion for engaging said disposal unit and a support disc connected thereto in a manner to form means for discharging a flushing medium from said abrading chamber into said grinding chamber, an arcuately formed abrading disc in said abrading chamber, a depending cylindrical flange on said disc, a driven annular gear formed integrally with said flange, power transmitting means between said impeller and said abrading disc, said power transmitting means comprising speed reducing means whereby said abrading disc operates at a slower speed than said impeller, a shaft, and a bayonet portion connected to said shaft and having a pair of depending arcuate feet interfitting with said sockets for drivingly connecting said power transmitting means to said circular adapter member, said speed reducing means including a stationary gear base removably secured to said support disc, a driving pinion secured to said shaft, and an intermediate gear pivotally mounted on said gear base for transmitting motion from said driving gear to said driven annular gear, a cover for said abrading chamber, said cover having a depressed top portion sloping toward a cover port, a spreader for directing the flushing medium onto the wall means of said abrading chamber and having an integral trifurcated upstanding flange in juxtaposition to said cover port for defining first flushing slots, and a handle secured to said spreader and having second flushing slots extending above said top portion and aligning with said first flushing slots to connect said depressed top portion and said spreader in flushing medium flow relationship.

References Cited in the file of this patent
UNITED STATES PATENTS

| | | |
|---|---|---|
| 1,116,544 | Barker | Nov. 10, 1914 |
| 2,001,423 | Horner | May 14, 1935 |
| 2,421,808 | Robertson | June 10, 1947 |
| 2,613,712 | Pearlman | Oct. 14, 1952 |
| 2,743,875 | Brezosky et al. | May 1, 1956 |
| 2,753,571 | Draper | July 10, 1956 |
| 2,781,175 | Metzger | Feb. 12, 1957 |
| 2,784,418 | Luoma | Mar. 12, 1957 |
| 2,795,253 | Coleman et al. | June 11, 1957 |
| 2,813,376 | Middlemark | Nov. 19, 1957 |
| 2,813,534 | Low | Nov. 19, 1957 |
| 2,869,794 | Modrey | Jan. 20, 1959 |